W. H. THIEMER.
UNIVERSAL JOINT.
APPLICATION FILED MAY 7, 1919.
1,366,039.
Patented Jan. 18, 1921.
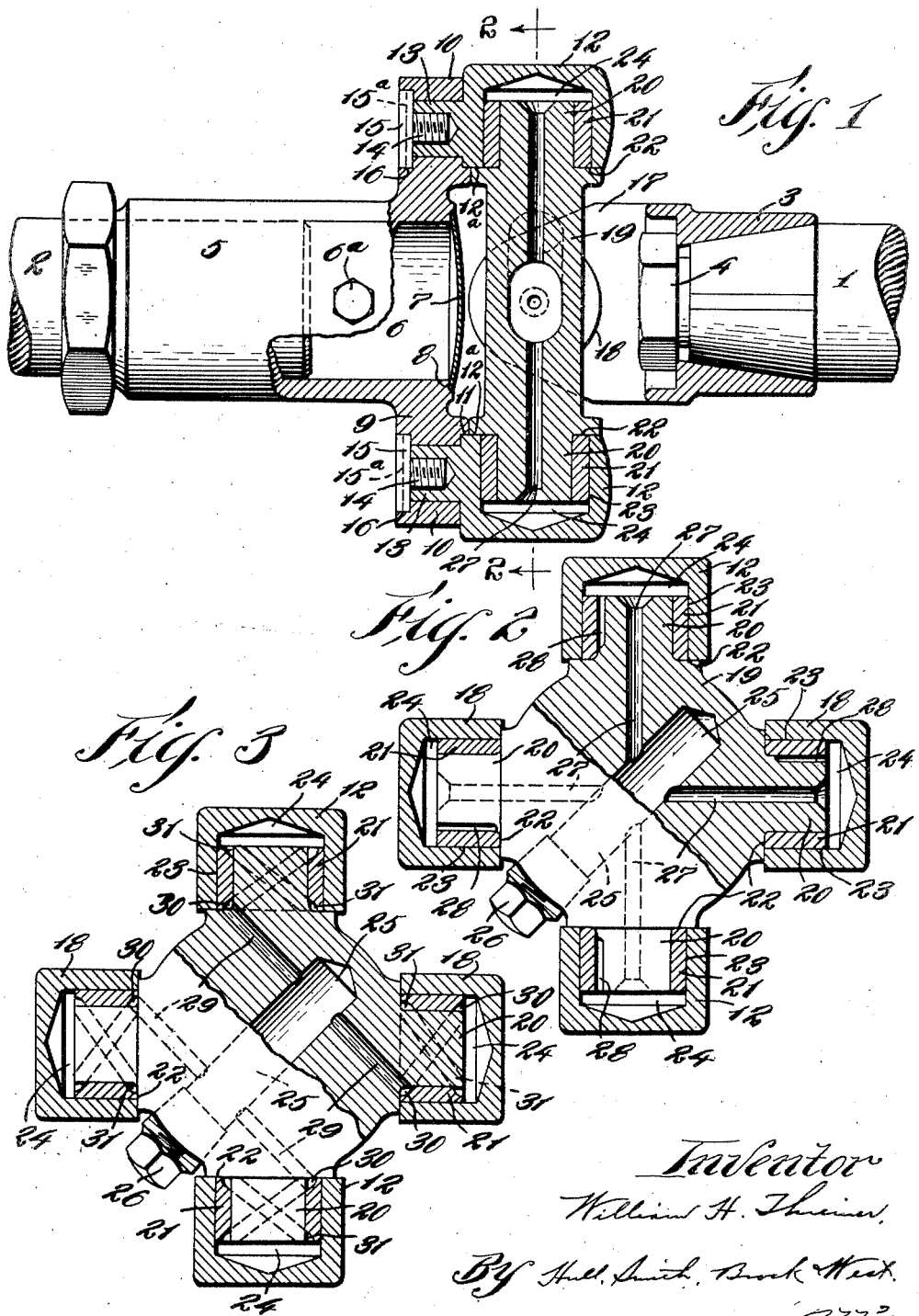

UNITED STATES PATENT OFFICE.

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,366,039. Specification of Letters Patent. Patented Jan. 18, 1921.

Application filed May 7, 1919. Serial No. 295,431.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.
This invention relates to universal joints and has for its general object to produce a joint of this character having novel and efficient means for lubricating the journals or bearings for the trunnions. I realize this object in and through the construction shown in the drawings forming part hereof, wherein Figure 1 represents a side elevation of such joint, together with its coöperating parts, certain of the parts being shown in section; Fig. 2 a transverse sectional view corresponding to the line 2—2 of Fig. 1, certain parts being shown in elevation; and Fig. 3 a view, similar to Fig. 2, showing a modification of the invention.
Describing by reference characters the various parts illustrated herein, 1 and 2 denote the end portions of shaft sections connected by my joint. The shaft section 1 is provided with a hub 3 which may be splined thereto, the hub being shown as provided with a tapered bore for the reception of the correspondingly tapered portion of the shaft end. At its extreme end, the shaft section is reduced and threaded for the reception of a nut 4 by means of which and the spline it is connected to the hub. The shaft section 2 is also splined to an elongated hub 5 which is shown as extending beyond the end of the shaft and providing therefor a lubricant well 6 having a filling opening closed by a removable plug 6ª and closed at its outer end by means of a concavo-convex plate 7 forced to a seat 8, said plate being preferably what is known to the trade as a "Welch plug." Extending transversely of the inner end of the hub is a supporting base or flange 9 having at each end thereof a flanged projection 10 which is faced off and machined to provide an accurate seat for the base of a bearing block, being provided with a shoulder 11 which is adapted to bear against and aline the adjacent side 12ª of the bearing block 12 with reference to a trunnion of the connecting member. Each block is provided with a stud 13 projecting from the base thereof into and nearly through a bore in the outer end of the base flange 9, the stud making a snug fit with said bore and being internally threaded to receive a stud bolt 14. Each stud bolt 14 is provided with a cylindrical head 15 adapted, when the bolt is screwed home, to fit within an annular recess 16 formed within the bottom of each flanged projection of the base and constituting an enlargement of the bore thereof. The annular recesses 16 are preferably each of the same depth as the heads 15, whereby the bottoms of said heads will be substantially flush with the bottoms of their respective flanged projections. Each bolt head may be slotted, as shown at 15ª, for the reception of a screw driver and, when the bolts are set up, they may be retained in place by merely staking or peening the metal at the base of the flanged projections into one or both ends of each slot.

The hub 3 is provided with a base 17 similar to the base 9 and having seats for blocks 18 similar in construction and arrangement to the corresponding parts carried by the hub 5.

Referring to Figs. 1 and 2, the rotatable connecting member 19 which is interposed between the shaft sections is generally circular in outline and is provided with trunnions 20 adapted to be fitted within bushings 21 supported at their outer ends each by a shoulder 22 surrounding the base of a trunnion and bearing against the inner face of a bearing block 12 or 18. Each bearing block is provided with a bore 23 extending outwardly from the face thereof and terminating within the outer surface of each block and forming beyond the ends of the trunnion and bushing therein a well 24 for lubricant.

The connecting member is provided with a well 25 in the central portion thereof for the reception of lubricant, this well being conveniently formed by drilling into said member a bore, the said bore extending diagonally from one side of the member across the central portion of said member, the outer end of said bore being preferably located about midway between two of the trunnions and the inner end terminating midway between the other trunnions and within the body of the member. The outer end of the bore may be closed as by means of a plug 26 threaded thereinto.

From the central well 25 thus provided within the connecting member, ports 27 extend through the trunnions and axially thereof, the outer ends of these ports communicating with the wells 24. For the purpose of supplying lubricant from the wells 24 to the bearings, ports 28 are shown as formed within the outer surfaces of the trunnions and within the bushings, the ports 28 being substantially parallel with the ports 27.

With the parts constructed and arranged as described, the well 25 having been filled with lubricant and the plug 26 inserted, this lubricant will, by centrifugal action, be distributed through the ports 27 to the wells 24 and thence through the ports 28 to the bearings formed between the interior of the bushings and the exterior of the trunnions.

In Fig. 3 there is shown a modification of my invention wherein, instead of employing axial ports for conducting lubricant from the well 25 to the wells 24, the lubricant is supplied to said wells by means of ports 29 each communicating at one end with the well 25 and at its opposite end with a spiral groove 30 provided between each trunnion and its bushing, the said grooves being shown as formed within the bushings and extending from the inner ends thereof to the outer ends, so that the lubricant may be delivered into the wells 24. Further distribution of lubricant to the bearing between each trunnion and its bushing may be secured by an additional spiral groove 31 formed within each bushing and extending from the well 24 to the inner end of the bushing, the inlet and outlet ends of the grooves 31 being preferably located 180° from the outlet and inlet ends, respectively, of the grooves 30 and each groove making about one-half turn about its trunnion.

In both forms of my invention, the lubricant is supplied by centrifugal action from the central well 25 to the wells 24 and thence to the bearings provided between the trunnions and the bushings. In the form shown in Fig. 3, the lubricant is supplied to the bearings in its passage to the wells 24 as well as after it has filled said wells, thus effecting a most complete lubrication of the bearings; in fact, the arrangement of the grooves 30 and 31 is such that jointly they extend entirely around each trunnion, thereby effectively lubricating the entire outer surface of the bearing therefor.

Having thus described my invention, what I claim is:—

1. A universal joint comprising a connecting member having a well for lubricant and trunnions projecting therefrom, bearings for said trunnions, bushings within said bearings surrounding said trunnions, each bearing having a well for lubricant beyond its trunnion, a port extending from the well in said member to the inner end of each trunnion, a port formed between each bushing and its trunnion and extending spirally from the inner end of the trunnion to the well in the bearing, and a port also formed between each bushing and its trunnion and communicating at its outer end with the lubricant well in said bearing and extending spirally about such trunnion to the inner end thereof.

2. A universal joint comprising a connecting member having a well for lubricant and trunnions projecting therefrom, bearings for said trunnions, bushings within said bearings surrounding said trunnions, each bearing having a well for lubricant beyond its trunnion, a port extending from the well in said member to the inner end of each trunnion, a port formed between each bushing and its trunnion and extending spirally from the inner end of the trunnion about half way around such trunnion to the well in the bearings, and a port also formed between each bushing and its trunnion and communicating at its outer end with the lubricant well in said bearing and extending spirally about half way around such trunnion to the inner end thereof.

3. A universal joint comprising a connecting member having a well for lubricant and trunnions projecting therefrom, bearings for said trunnions, bushings within said bearings surrounding said trunnions, each bearing having a well for lubricant beyond its trunnion, a port extending from the well in said member to the inner end of each trunnion, a port formed between each bushing and its trunnion and extending spirally from the inner end of the trunnion to the well in the bearing, and a port also formed between each bushing and its trunnion and communicating at its outer end with the lubricant well in said bearing and extending spirally about each trunnion to the inner end thereof, the ends of the ports formed between each bushing and its trunnion being spaced substantially 180 degrees apart.

4. A universal joint comprising a connecting member having a well for lubricant and trunnions projecting therefrom, bearings for said trunnions, bushings within said bearings surrounding said trunnions, each bearing having a well for lubricant beyond its trunnion, a port extending from the well in said member to the inner end of each trunnion, a port formed between each bushing and its trunnion and extending spirally from the inner end of the trunnion to the well in the bearing, and a port also formed between each bushing and its trunnion and communicating at its outer end with the lubricant well in said bearing and extending spirally about each trunnion to the inner end thereof, the ends of the ports formed between each bushing and its trunnion being spaced substantially 180 degrees apart and each port extending substantially half way around its trunnion.

In testimony whereof, I hereunto affix my signature.

WILLIAM H. THIEMER.